United States Patent [19]

Roche

[11] 3,841,369

[45] Oct. 15, 1974

[54] SEAMLESS EDGE LAMINATION APPARATUS

[76] Inventor: Edward Noland Roche, 5 Hickory Hill Rd., Cockeysville, Md. 21030

[22] Filed: Feb. 16, 1973

[21] Appl. No.: 333,122

[52] U.S. Cl............... 144/136 R, 83/5, 90/16, 90/18, 144/133 R, 144/316 R
[51] Int. Cl............. B27d 1/00, B27f 1/00
[58] Field of Search... 90/18, 16; 144/136 R, 133 R, 144/316, 89 R, 315 R; 83/404.1, 477.2, 5

[56] References Cited
UNITED STATES PATENTS

| | | | |
|---|---|---|---|
| 160,939 | 3/1875 | Miller | 83/404.1 |
| 194,077 | 8/1877 | Davis | 144/89 |
| 582,388 | 5/1897 | Chase | 144/136 R |
| 2,709,463 | 5/1955 | Gustin | 83/477.2 |
| 3,322,171 | 5/1967 | Cornell | 144/136 R |
| 3,625,269 | 12/1971 | Nolan | 144/136 R |

Primary Examiner—Andrew R. Juhasz
Assistant Examiner—Z. R. Bilinsky
Attorney, Agent, or Firm—John F. McClellan

[57] ABSTRACT

Wooden cabinet doors and the like are covered on a face and on edges adjacent the face by a single unbroken piece of melamine or similar hard brittle high pressure laminate, the necessary seamless sharp bends are made by grooving the high pressure laminate to a critical depth, cementing, and bending, causing one edge of the groove to be supported during bending through a pre-grooving laminating and taping technique; a novel tool provides the necessary precise-depth and shape V-section groove and an adjacent excess-glue receiving groove having a surface continuous with a face of the V-section groove; the means and method encompass pre-laminating both faces of the base sheet.

2 Claims, 18 Drawing Figures

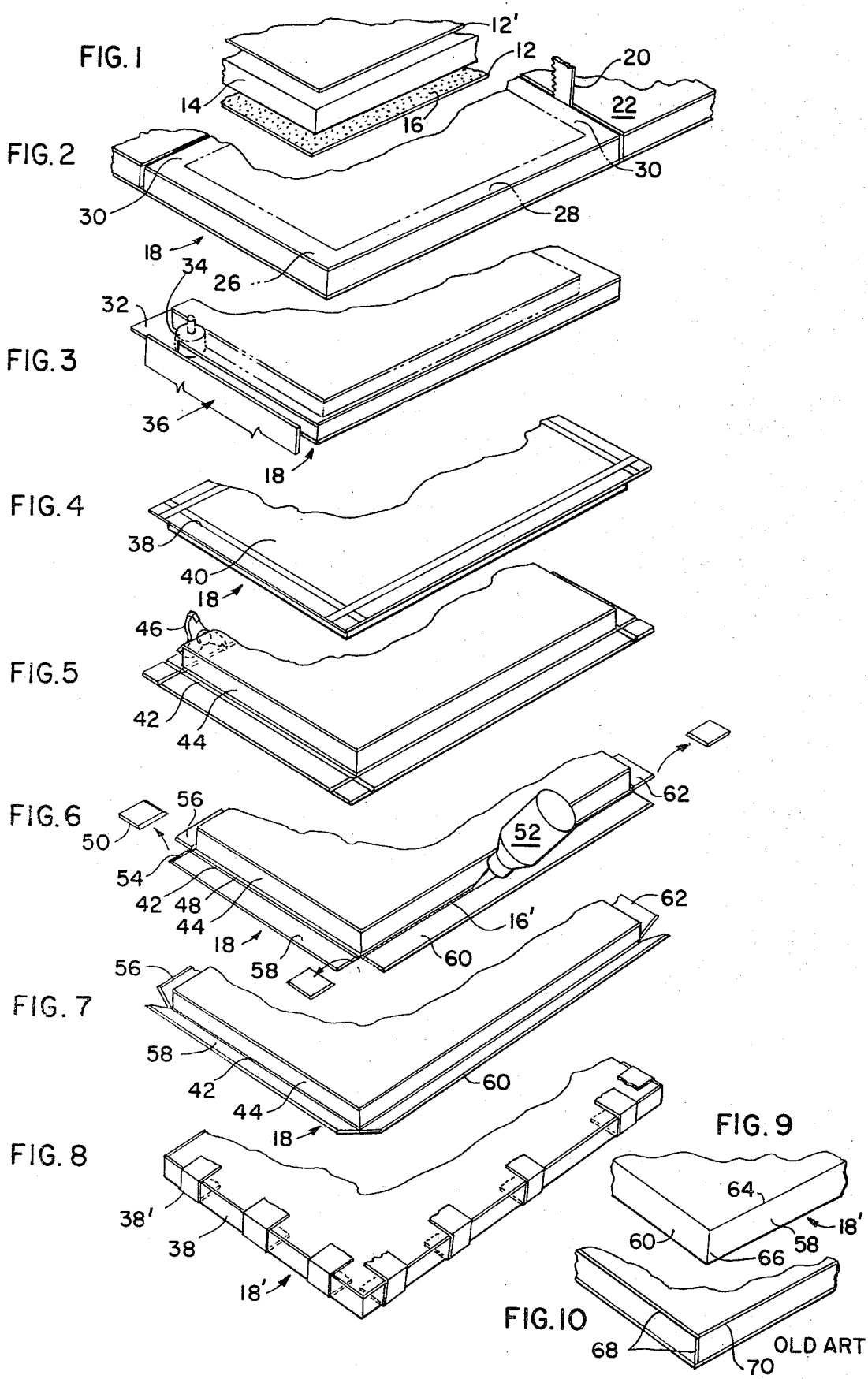

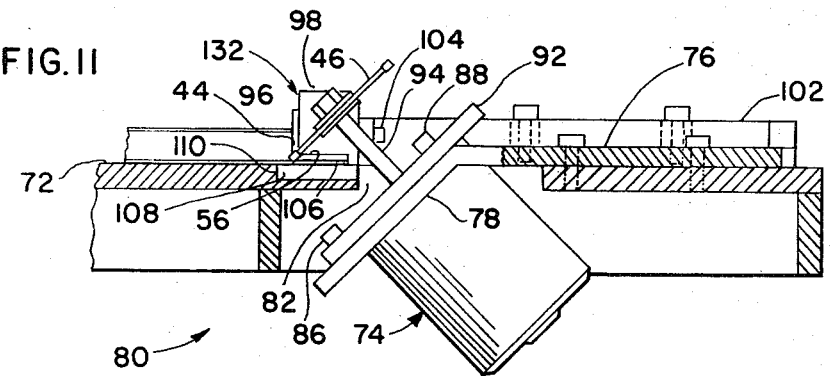
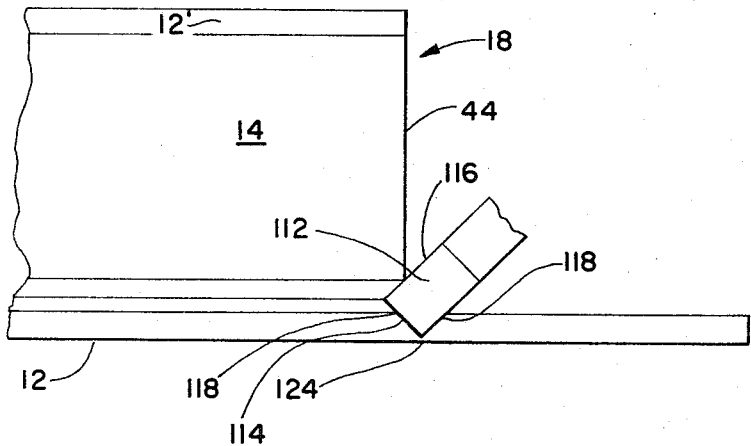
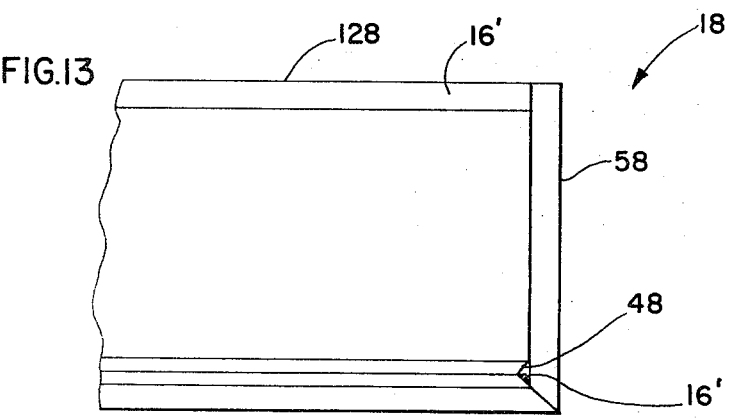

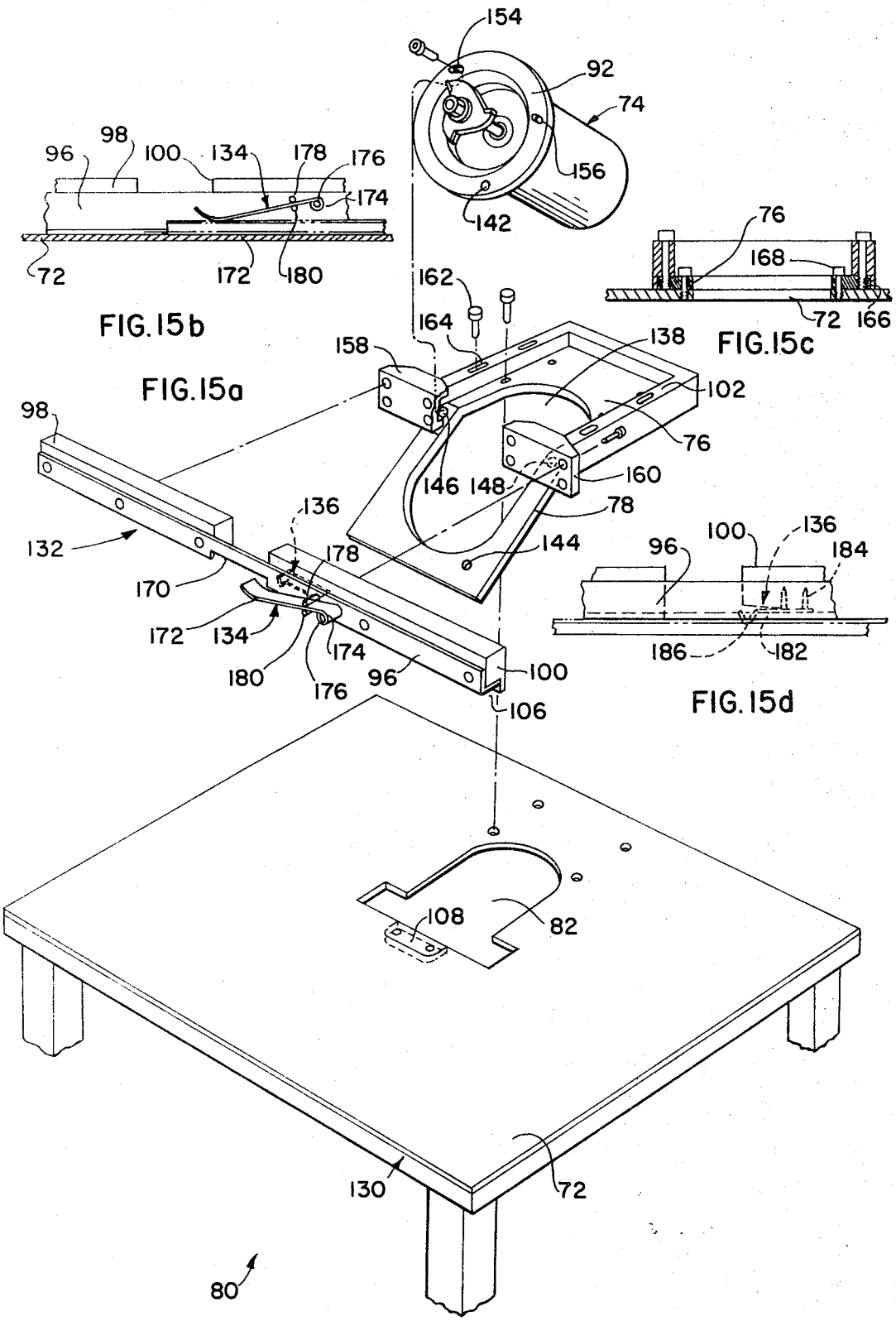

SEAMLESS EDGE LAMINATION APPARATUS

This invention relates generally to wood cabinet making and specifically to means and method for producing polygonal cabinet doors and the like of predetermined size with unbroken laminations of very hard and brittle high pressure laminate sheet structure extending from one face over one or more edges of the doors.

In the prior art, various laminating devices and methods have been disclosed in which laminating sheets are wrapped around corners or bent with a notched substrate (U.S. Pat. Nos. 963,491; 2,246,660; 3,058,868; or 3,595,287) grooves and bent by themselves (U.S. Pat. No. 3,456,701) and otherwise fitted and secured.

However, the prior art deals with soft materials or with unsupported harder materials or more generally with relatively long-radius bends, equalling or exceeding the thickness of the veneer. Where hard, brittle high pressure laminate sheets such as those used on highest quality furniture are applied to a base, in the prior art, mitering and fitting as separate parts has been necessary at intersections of planar surfaces, the high pressure laminate being one part and the base another.

Two considerations have limited the prior art: (1) the assumed necessity to modify the characteristics of hard laminar materials by solvents or heating before attempting short-radius bends or to groove and bend such materials by themselves, and (2) the generally imprecise nature of woodworking equipment and methods.

Appearance of laminated furniture is greatly affected by joint precision because high pressure laminates themselves typically have a thin, decorative surface underlaid by a contrasting substrate which shows at imperfect miter-joints. Additionally, glue-lines and excess glue can affect appearance by showing through.

Because precise mitering is necessary when applying hard, brittle material at abutting substrate corners, using prior art technique and equipment, production costs for quality work are very high. Typically, many small, thin pieces must be separately shaped and cemented in place on carpentered wooden substrates, no two of which are identical. Considerable cut-and-try fitting is necessary, together with post assembly finishing in many cases to remove sharp edges and excess glue extruded from the joints.

A principal object of the present invention is to provide means and method for mass production of high pressure laminate faced and edged articles such as cabinet doors of wood and the like having a continuous high pressure laminate surface from the face over the edges, and with every joint between surfaces substantially perfect, the whole being produced at a fraction of present cost.

Other objects are to provide production means and method for producing articles as described in which whole-sheet laminating is the first step, and in which the high pressure laminate edge is attached in preliminary position as part of the whole-sheet lamination.

Still other objects are to provide means and method as described by which semi-skilled labor can replace highly skilled labor while producing higher quality work several times faster, by which scrap and spoiled work is substantially reduced, by which face patterns are automatically matched to edge patterns without intervening joining lines and by which excess glue is applicable to assure full joining at the crucial mitered areas but without glue extrusion which would mar appearance.

A further object is to provide means and method as described which produces free-edge miter joints which join as perfectly as separately sawed joints can be joined by any method.

And still further objects are to provide a cutting tool arrangement which is relatively immune to angular error arising from incorrect angular setting about the fold line of the high pressure laminate, which affords full visibility for observing the progress of the cut, and which protects the operator from flying debris by canting the exposed cutter periphery away from the operator and deflecting material removed by means of a fence arrangement.

In brief summary, the invention includes a method of cementing or otherwise laminating full-sized sheets of high pressure laminate to a matching full-sized sheet base of plywood, chip board, or the like, sawing out the individual cabinet doors oversize by a margin at the edges to be laminated, the margin being proportional to the thickness of the veneer and base, milling or otherwise reducing the base to predetermined door size less laminate thickness-allowance leaving the high pressure laminate protruding as a margin, precision milling a deep 90° V-section groove in the inner face of the high pressure laminate adjacent to the edge of the base, using a special tool which according to this invention has a cutter design and thickness proportioned to produce at the same time an optimum glue groove in the base having a face continuous with the 90° V-section groove, and cementing and folding the protruding high pressure laminate margins to cover the edges of the door, preferably taping the outside of the fold line prior to folding.

The above and other objects and advantages of the invention will become more readily apparent on examination of the following description, including the drawings, in which like numerals refer to like parts:

FIGS. 1 — 9 are isometric details showing successive manufacturing steps and apparatus according to this invention;

FIG. 10 is an isometric detail showing old-art structure corresponding to the FIG. 9 structure;

FIG. 11 is a side elevation partially in section showing work positioned in a machine;

FIG. 12 is a side elevation detail showing on a larger scale a portion of the FIG. 11 structure;

FIG. 13 is a side elevation of the workpiece shown in FIG. 12 at a further stage of manufacture;

FIG. 15a is an exploded isometric view of the FIG. 14 structure;

FIG. 15b is an elevation detail taken at 15b—15b, FIG. 14;

FIG. 15c is an elevation section taken at 15c—15c, FIG. 14; and

FIG. 15d is an elevation detail taken at 15d—15d, FIG. 14.

Figure 14:
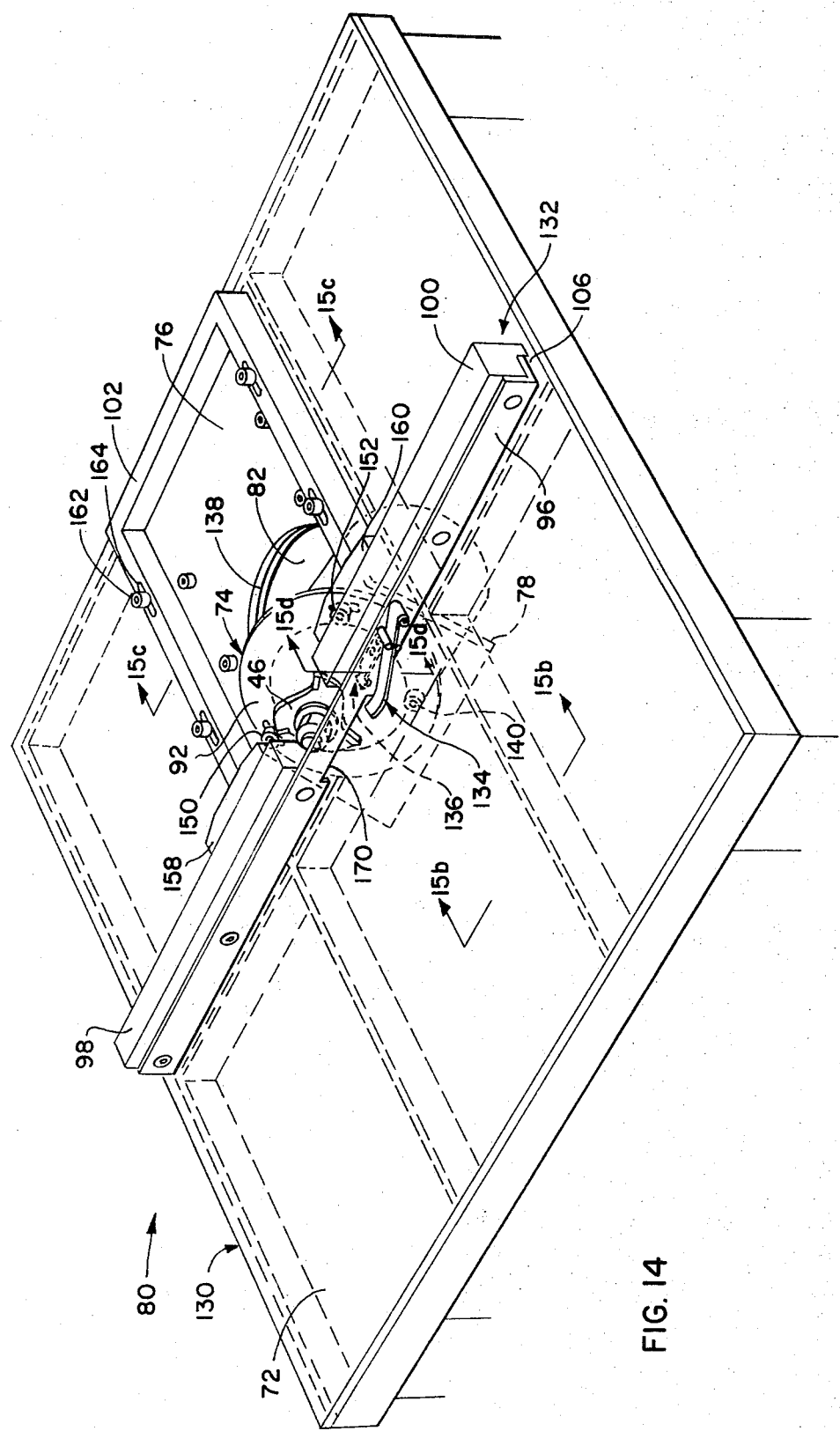
FIG. 14 is an isometric assembly view of the upper portion of a machine according to this invention.

First, referring briefly to the relations of the drawings, FIGS. 1—9 show in broad outline successive steps in manufacturing a laminated cabinet door having continuous face-to-face high pressure laminate covering and tightly mitered edge-to-edge joining at the corners, as indicated in the FIG. 9 detail and as contrasted with the FIG. 10 mass production old art article; FIG. 4 shows a portion of the special apparatus used in the method and shown in more detail in FIGS. 11 and 14 – 15d; the remaining two FIGS., 12 and 13, show respectively in enlarged scale a portion of the FIG. 11 apparatus and workpiece, and the workpiece at a further stage.

FIG. 1 shows the first step in a method according to this invention, in which entire 4 × 8 ft. ft. or 4 × 12 ft. sheets 12, 12' of phenolic resin, melamine resin or other hard, brittle plastic having the same general fabrication characteristics, such as currently widely available materials sold under the trademarks "Formica," "Textolite," "Nevamar," and the like, are cemented to a matching size base 14 such as three-fourths inch thick plywood, chipboard, or other wood composite board. Ordinarily one-sixteenth inch thick high pressure laminate sheet is used, and is cemented on with a suitable cement 16. This may be a free-flowing casein cement or rubber base cement, the exact formulation not being critical.

FIG. 2 shows the next step, in which a door blank or panel 18 is cut as by saw 20 from the laminated whole sheet 22 formed of the FIG. 1 step. As indicated by the reference lines, the door blank 18 is cut oversize, with extra margins 24, 26, 28, 30 each equal in width to the thickness of the base plus twice the thickness of the high pressure laminate to allow for edge overlap.

FIG. 3 shows the extra margins of the door blank base material 14 and upper laminate 16' being milled away to leave the high pressure laminate sheet 12 protruding at all edges. The distance of protrusion is, as indicated, equal to the thickness of the base plus twice the thickness of the high pressure laminate for a single face laminate and three times the thickness of the high pressure laminate for a double-face laminate as shown. Preferably the door blank 18 is fed past a side-milling tool 34, guided by contact of the outer edge of the plastic with a fence 36 on the mill. This keeps the protrusion of the high pressure laminate uniform in width as measured from the door blank.

FIG. 4 illustrates the preferable next step, in which the door blank 18 is inverted and tape 38 is applied across the exposed or front face 40 of the high pressure laminate in sufficient length and width to cover the area proximate the junction of the edge of the wood base and the high pressure laminate on the opposite side. This step is not essential, using the tool of this invention, and if desired to use tape, the tape may be applied after grooving.

FIG. 5 shows the taped door blank again inverted and having a very straight, precisely angled V-section groove 42 of a precise depth and spacing from the edges 44 of the door blank 18 cut in the high pressure laminate margin by a special mill represented by tool 46 along each milled border of the base and extending in a straight line through the outer edges of the high pressure laminate. AS will be seen, the tool 46 is so proportioned and positioned as to leave a glue groove 48 in the edges 44 of the base having a surface contiguous with the V-section groove 42, insuring free flow of cement from one groove into the other.

FIG. 6 actually illustrates two step: First, removing the corner square 50 after cutting along the apices of the V-section grooves 42 past the points where the grooves cross at the corners, and second, applying free flowing adhesive 16' (such as casein) to the V-section grooves using a conventional applicator 52. In this cutting, care is taken to leave a full half-width of groove on the work to insure perfect joining at the corners. A generous quantity of adhesive 16' is applied to the bottom of the V-section groove and sparingly to the cut corner edges 54.

Adhesive is also applied to the separate margins 56, 58, 60, 62, of the high pressure laminate and, if useful, to the edges 44 of the base down to the glue grooves.

FIG. 7 shows the folding operation in which the high pressure laminate margins 56, 58, 60, 62 are folded about the V-section grooves 42 to cover the edges 44 of the base. This may be done in a brake, or by hand, pressing the high pressure laminate margins around in succession on a table.

FIG. 8 shows the completed laminated cabinet door 18' with the turned high pressure laminate margins 56, 58, 60, 62 secured by tape 38' applied around the margins to provide cement curing time.

FIG. 9 shows the completed work which has a smooth, short-radius high pressure laminate seamless-bend 64 from the face onto the edges of the door, and a tightly mitered prefitted minimal gap joint 66 between the edge portions 60 and 58.

FIG. 10 shows an old-art good quality mass production work, in a detail similar to FIG. 9, with relatively wide joints 68 at all edges and corners. All joints show contrasting substrate 70, since feather edges necessary to conceal the high pressure laminate substrate cannot be produced and fitted economically in mass production. Adhesive is often apparent in old art edge joints also. The glue grooves 48, FIG. 6, of this invention help prevent excess adhesive from being extruded at the corners, but have a more important function explained later in reference to FIG. 13.

FIG. 11 shows in partial elevation section the general arrangement of work support or table top 72, fence assembly 132, drivemotor assembly 74, including cutting tool 46 in the machine 80 of this invention provided to produce the previously described V-section groove and contiguous surface glue groove structure in high pressure laminate margin 56 and base edge 44 respectively of the door blank 18 being passed by the cutting tool on the table top. Angle bracket 76 screwed at the table top, has a leg 78 which passes down at a 45° angle through a hole 82 in the table top to a position generally below the table top. The leg 78 below the table top adjustably mounts drivemotor assembly 74 by means of screws 86, 88 (90 now shown here) attaching to a motor mounting ring 92, with the drivemotor shaft 94 fixed at a 45° angle to the table top 72. Combination-cutting tool 46 is screw-clamped or otherwise suitably mounted on shaft 94 with the inner edge of the periphery in near-grazing proximity to the table top. A continuous angle-section fence facing or work guide 96 is adjustably positioned above the table top 72 by undercut blocks 98 (shown here) and 100. The undercut blocks are fixed to the work guide 96 on either side of tool 46, and are in turn supported by a frame 102 screwed to the blocks and adjustably fixed at table top level to angle bracket 76 by screws 104. This arrangement guides the work moved past by the operator by contact with the edge 44. High pressure laminate margins such as 56 shown are freely received below the raised strip fence and in the undercut recess 106 in the blocks. A relatively soft insert 108, such as a wooden block, is affixed in a recess 110 in the table top at the closest approach of tool 46 to prevent the tool from accidentally being damaged during cut-depth adjustment.

The relative thicknesses in FIGS. 12 and 13 are exaggerated to show the invention more clearly.

FIG. 12 details in end elevation on a larger scale than FIG. 11 the general proportions of the tool, the work, and the depth of cut. Laminated cabinet doors are usually from ⅜ to 1 inch in thickness, thirteen-sixteenths to seven-eighths inch being about average, and being made up from a three-fourths inch thick base material covered by one-sixteenths inch thick melamine 12, 12', or equivalent on one or both faces.

The tool 46 preferably has opposed axial faces with a cutting surface on each and a peripheral-cutting surface, forming a combination double-end milling and side-milling cutter having plural identical sharp cornered flutes 112 with raked cutting edges 114 on the side and both ends 114, 118 at substantially 90° to each other. Cutting width of the tool should be greater than 1½ times the high pressure laminate thickness; preferably it should be at least twice the high pressure laminate thickness. The operative guide structure is thus positioned in a plane passing diagonally through the side-cutting surface on a line substantially tangent to it. With this proportion and arrangement the work is positioned by the fence so that, in section, the cut passes diagonally through the intersection of the edge 44 of the base 14 with the adjacent surface 122 of the margin, and glue groove 48 is produced in the edge 44 of the base. The glue groove so produced has a face continuous with a face of the V-section groove 42 in the high pressure laminate, so that when the V-section groove is folded shut, only a very thin, strong glue-line is left, the excess adhesive flowing smoothly and directly into the glue groove, preventing trapped glue from loading the joint and wedging apart thin and fragile hinge material 124 at the apex of the V-section cut.

The present inventor discovered that depth of cut is a crucial factor in practicing the invention, too great depth giving an insubstantial, unreliable joint requiring reinforcement and uneconomical handling, and too shallow depth producing brittle splintering, marring the work and requiring extra reinforcement and extra steps to remove the splinters. The preferred depth of cut leaves 0.002 inch of material remaining as hinge 124, which, when folded about according to this invention yields a smooth, continuous bend of approximately 0.002 inch radius, free of splinters, durable and substantially perfect in appearance. The absolute maximum thickness left should not exceed 0.006 inch and this thickness is not uniformly reliable. The pre-grooving attachment of the high pressure laminate to the base prevents flexing and bowing which tend to pop the pieces apart when cut and when folded, and makes possible the use of only 0.002 to 0.006 with thickness along the fold-line.

The initial thickness of the high pressure laminate should not be so great that the weight overloads the thin portion 124 during bending, requiring special handling; this is not a problem with the thicknesses used in commercial cabinet work.

FIG. 13 shows an end elevation, similar to FIG. 12, after the corner squares 50 (FIG. 6) have been removed, and high pressure laminate margin 58 has been cemented and folded in place, covering the edge of the base.

Excess adhesive 16' applied to insure thorough coverage of all parts of the V-section faces, has been safely extruded into the glue groove 48. No further finishing operation on this portion of the door is necessary since the end 126 of the high pressure laminate fits precisely flush with the face 128 of the sheet 16'. The automatically fitting corner is tight and completely united, making it effectively as strong as if solid, with no open edge to snag and rip aprt in use, and with a nearly invisible line at the fit.

FIGS. 14 and 15 further detail the special machine 80 for cutting the precise V-section grooves according to this invention; these Figures will be described together.

The machine comprises generally a table assembly 130, having a bell shaped hole 82 in the table top 72; a fence assembly 132, including two work hold-down assemblies 134 and 136; a motor-mounting angle bracket 76, and drivemotor assembly 74 including cutting tool 46. The parts are preferably tightly assembled using high tensile strength socket head screws.

As noted previously in reference to FIG. 11, angle bracket 76 joins drivemotor assembly 74 to the table top.

Depth of cut adjustment is made by means of a pivot screw and two clamp screws. The drivemotor assembly 74 rests in collar shaped aperture 138 in angle bracket 76. The pivot screw 140 (FIG. 14) passes through a close fitting hole 142 (FIG. 15) in motor mounting ring 92 and tightens in a tapped hole 144 (FIG. 15) in the 45° downward leg 78 of angle bracket 76. The pivot axis thus parallels the spindle axis. Similar tapped holes 146 and 148 (FIG. 15) in upper portions of the angle bracket receive clamping screws 150 and 152 (FIG. 14) which engage slotted holes 154, 156 (FIG. 15) in the motor mounting ring, allowing the motor to be clamped after adjustment in rotation about the pivot screw. It will be seen that in this adjustment the cutter safely remains a constant distance from the guide structure above it. The pivot screw is preferably located as shown, below the motor and to one side, to provide finer cut-depth adjustment.

C-shaped frame 102, which terminates in fence supporting pads 158 and 160 at the open ends of the C, can be slid toward and away from the work to adjust the fence-to-tool distance, and then clamped by means of screws 162 which pass through slotted holes 164 in the frame and engage tapped holes 166 (FIG. 15c) in the angle bracket, which in turn is attached by screws 168 to the table top. This arrangement permits the fence assembly, drivemotor assembly, and angle bracket to be removed as a unit for inspection and replaced without disturbing the critical depth-cut and alignment adjustments.

The fence assembly 132 includes (as previously noted in reference to FIG. 11) a pair of aligned blocks 98, 100 with a space between for the cutting tool 46. Each block has an undercut or recess 106 along the base on the side of the work. Angle-section work guide 96 is screwed to the vertical faces of the blocks 98, 100 and the horizontal leg of the fence angle is received in the undercut 106. The undercut is made large enough and deep enough to receive freely the high pressure laminate margins of the work.

The work guide 96 is positioned on the same end of the tool 46 as the work, and has a small notch 170 at the bottom in which cutting portions of the tool pass the soft block 108 inlaid in the table top under the tool position as described in reference to FIG. 11.

Preferably, two work hold downs are used, the first 134 engaging, as indicated in FIG. 15b, the full thickness of the work and the second 136 engaging, as indicated in FIG. 15d, the high pressure laminate margin received under the overhang of the fence blocks.

As best shown in FIGS. 15a and 15b, the first holddown 134 comprises an upwardly curved spring 172 having a looped end 174 secured to the fence by a screw 176. Two pins 178 and 180 protruding from the fence above and below the spring position the spring at the proper height to exert downward pressure on the work.

As best shown in FIG. 15d, the second holddown 136 also has a spring 182; the spring is secured by screws 184 to the underside of the fence in the overhang of block 100 where it exerts downward pressure on the high pressure laminate through a U-shaped bend 186 at the free end of the spring.

In summary as to the machine and method described, numerous advantages are inherent. The arrangement of the fence between the end of the tool and the work provides the closest possible guidance and rigidity of operation. Additional precision of positioning is provided by the rigid motor mounting. Coupled with the holddown arrangement and the pre-grooving lamination of the work, these features make possible the practice of the invention as described. Visual access to the work is good, as the operator stands over and behind the work, and the 45° inclination of the tool causes any debris thrown to be safely thrown in a plane inclined away from the operator or else deflected down by the superimposed portion of the fence. The 90° included angle of the tool forming the V-groove hinge line in the high pressure laminate margin makes the exact inclination of the tool with respect to the work relatively non-critical. A setting angle difference causing cutting more into one face of the V automatically cuts less into the other face of the V, so that the parts made with the different setting angle still produce a square corner, correctly positioned, so long as the apex of the V is correctly positioned and of the proper depth.

The method allows pre-lamination of both faces, avoiding several extra operations, and is also well adapted for single-face lamination work.

Obviously, many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. A tool for use in fitting high pressure laminate sheet material to base sheet material, comprising structure defining a supporting surface for sheet material, the supporting surface having an aperture therein, drive means including a spindle extending upwardly from the supporting surface aperture at substantially a 45° angle to the supporting surface, a rotary cutter having opposed axial faces with a cutting surface on each and a peripheral-cutting surface forming therewith, in section, respectively substantially right-angle corners; the drive means spindle mounting the rotary cutter with the right angle corner nearer to the drive means positioned for cutting proximate the supporting surface, guide structure positioned in a plane passing diagonally through the peripheral-cutting surface on a line substantially tangent thereto, the guide structure including an aperture intermediate the length thereof, a portion of the rotary cutter positioned in the aperture beneath a portion of the guide structure, and means for adjustably pivoting the drive means relative to the supporting surface about an axis in parallel spaced relation with the axis of said spindle, whereby the portion of the rotary cutter in the aperture passes by said portion of the guide structure at a substantially constant distance therefrom during said adjustable pivoting.

2. A tool as recited in claim 1, wherein the means for adjustably pivoting the drive means includes a bracket, structure defining a pivot, a clamp attaching the drive means to the bracket; and means for mounting the bracket to the supporting surface adjustably in a direction substantially perpendicular to said plane of the guide structure.

* * * * *